United States Patent Office 3,451,967
Patented June 24, 1969

3,451,967
PROCESS FOR THE POLYMERIZATION OF TRIOXAN UTILIZING A FLUOROARSENATE
Herbert May, Windsor Tower, N.Y., and Brian John Kendall-Smith, Birmingham, and John Alan Dodd, Staffs, England, assignors to British Industrial Plastics Limited, London, England, a corporation of the United Kingdom
No Drawing. Continuation-in-part of application Ser. No. 508,590, Nov. 18, 1965, now Patent No. 3,395,124, dated July 30, 1968. This application Nov. 21, 1966, Ser. No. 595,667
Claims priority, application Great Britain, Nov. 23, 1964, 47,553/64
Int. Cl. C08g 1/20, 1/18, 1/04
U.S. Cl. 260—67
11 Claims

ABSTRACT OF THE DISCLOSURE

A process for preparing high molecular weight oxymethylene homopolymers and copolymers suitable for molding, by polymerizing trioxan in the presence of certain hexafluoroarsenates and related compounds.

---

This invention is concerned with high molecular weight polymers, and especially relates to a process for the polymerization of trioxan.

This application is a continuation-in-part of our U.S. Patent No. 3,395,124, granted July 30, 1968.

According to the present invention a process for preparing a high molecular weight oxymethylene polymer consists essentially in effecting the polymerization of trioxan in the presence of a catalytic amount of a compound containing the hexafluoroarsenate anion, $AsF_6^-$, or a substituted hexafluoroarsenate anion wherein one or two of the fluorine atoms are each replaced by another electronegative group.

The term "polymerization" as used herein is intended to include both homopolymerization of the trioxan and copolymerization of the trioxan with one or more other copolymerizable compounds.

Suitable copolymerisable compounds are cyclic ethers and acetals, styrene and styrene derivatives, aldehydes, allyl compounds, cyclic esters, unsaturated aliphatic hydrocarbons, vinyl ethers and esters, and N-vinyl and C-vinyl heterocyclic compounds. Suitable such copolymerizable compounds include dioxolan, tetroxan, ethylene oxide, styrene, α-methyl styrene, α-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl Cellosolve, allyl cyanide, allyl benzene, allyl glycidyl ether, allyl aclohol, allyl beta-cyclohexyl propionate, allyl phenyl ether, diallyl phosphate; beta-propiolactone, delta-valerolactone, epsilon-caprolactone, trichloroethylidene lactate, methylene glycollate, lactide, ethylene oxalate, dioxanone; isobutene, butadiene, isoprene, pentadiene-1,3, cyclohexene, heptene-1, octene-1, cyclo-pentadiene, 4-vinyl cyclohexene, beta-pinene, bicyclo[2,2,1]hept-2-ene, bicyclo[2,2,1]hepta-2,5-diene; methyl vinyl ether, ethyl vinyl ether, n-butyl vinyl ether, isobutyl vinyl ether, vinyl 2-ethyl hexyl ether, phenyl vinyl ether; vinyl acetate; N-vinyl carbazole, 2-vinyl pyridine, and 2-vinyl-1,3-dioxan. Normally these other comonomers will be reacted in amounts between 0.01 and 50%, based on the total weight of reactants, preferably between 0.1 and 20%.

Suitable catalysts include
(a) Carbonium hexafluoroarsenates, for example triphenyl methyl hexafluoroarsenate, diphenyl methyl hexafluoroarsenate, diphenyltolyl methyl hexafluoroarsenate, phenylditolyl methyl hexafluoroarsenate, tritolylmethyl hexafluoroarsenate, dioxolinium hexafluoroarsenate, acetyl hexafluoroarsenate, and benzoyl hexafluoroarsenate;

(b) Oxanium and hydroxonium hexafluoroarsenates, for example the trialkyl, e.g., triethyl, hexafluoroarsenates;

(c) Aryl diazonium hexafluoroarsenates, for example phenyl diazonium hexafluoroarsenate;

(d) Nitryl and nitrosyl hexafluoroarsenates;

(e) Sulphonium hexafluoroarsenates, for example triethyl sulponium hexafluoroarsenate; and (f) Compounds similar to those designated (a) to (e) above but wherein one or two of the fluorine atoms are each replaced by another electronegative group, for example chloro, hydroxyl or fluorosulphonate. Examples are trityl pentafluorochloroarsenate, trityl pentafluorohydroxyarsenate, and phenyl diazonium hydroxypentafluoroarsenate.

The process is preferably carried out with the minimum of moisture and suitably under anhydrous conditions. It may be conducted under bulk conditions or it may be of advantage to conduct the polymerization in an inert liquid medium which may be a solvent or nonsolvent for the monomers under the polymerization conditions. Suitable solvents include saturated aliphatic and cycloaliphatic hydrocarbons, chlorinated aliphatic and cycloaliphatic hydrocarbons, and aliphatic and aromatic nitro hydrocarbons. Cyclohexane is particularly suitable. It is often desirable to mix the monomer, or in the case of copolymerization the comonomers, with an inert liquid medium and then to add the catalyst in solution in the same or a different inert medium. For instance, the comonomers trioxan and styrene may be mixed in cyclohexane, and the catalyst may be added in a solvent such as nitropropane or nitroethane.

The temperature of the reaction is preferably between 0° C. and 100° C. depending on the reactants, solvent and so on, and the reaction may, if desired, be carried out under a dry inert atmosphere, such as carbon dioxide or nitrogen. In some cases, it is suitable to use superatmospheric pressure.

The catalysts of the present invention can readily be removed from the formed polymer by suitable procedures, such as washing, milling, or agitating the polymer with solvents or neutralising agents for the catalysts. It is particularly effective to remove the catalyst by treatment with a basic substance such as an amine or ammonia. The polymer is then thoroughly washed after such treatment to remove all residues, and dried.

There may be incorporated into the polymers formed by the process of the invention any of the stabilizers, antioxidants, pigments, ultraviolet light absorbers and similar materials commonly used as additives with high molecular weight oxymethylene polymers. The polymers may also, if desired, be stabilized by treating them with compounds which react with any free end group. For instance, they may be acetylated at the endgroups by reaction with acetic acid or acetic anhydride.

Polymers produced in accordance with the process of this invention are particularly useful for injection, compression and extrusion molding.

The following examples are given for the purpose of illustrating the invention. In these examples the inherent viscosity has been determined at 60° C. on a 0.5% solution of the polymer in p-chlorophenol containing 2% alpha-pinene as stabilizer. The $K_{222}$ value (rate of loss of weight at 222° C.) was measured by the method described by Schweitzer, McDonald and Punderson in the Journal of Applied Polymer Science 1959, 1, 160.

EXAMPLE 1.—HOMOPOLYMER

A reaction vessel was charged with 50 g. trioxan (freshly distilled from stearylamine and calcium hydride) and 50 g. cyclohexane (dried by passing through an Amberlite IR-120 ion-exchange column). The solution was maintained at 60° in an atmosphere of dry air, and 1.5 g. of a 1% solution of triphenyl methyl hexafluoroarsenate in 1-nitropropane was added with vigorous agitation. The trioxan polymerized rapidly; the reaction was allowed to proceed for 3 hours.

When polymerization was complete, about 50 ml. acetone were added and the resulting slurry was filtered. The resulting white polymer was homogenized by high speed agitation with about 100 ml. acetone, filtered, and washed with about 200 ml. distilled water. The polymer was then treated with 400 ml. approximately 3% aqueous ammonia at 85° for 5 minutes, filtered, washed with about 200 ml. distilled water, homogenized with acetone as before and finally dried in a vacuum oven at 50° C. The yield of polymer was 38 g. (76%). The polymer had a $K_{222}$ value of 0.38% per minute and an inherent viscosity of 2.79.

EXAMPLE 2.—COPOLYMER

A reaction similar to that described in Example 1 was carried out, with the exception that 1.5 g. (3%) styrene was incorporated as comonomer in the reaction mixture. The yield of polymer was 30 g. (60%). The polymer had an inherent viscosity of 1.75.

EXAMPLE 3.—HOMOPOLYMER

A reaction vessel was charged with 173 g. trioxan, freshly distilled from stearylamine and calcium hydride, and 87 g. cyclohexane (dried by passing through an Amberlite IR-120 ion-exchange column). The solution was maintained at 80° C. in an atmosphere of dry air and 0.13 g. tritolylmethyl hexafluoroarsenate was added as a 2½% solution in nitropropane with vigorous agitation. The solution became cloudy in about 15 minutes, and polymerization was allowed to continue for 3 hours, when the reaction mixture became completely solid and had to be broken up.

The polymer was recovered as in Example 1, but using approximately three times the amounts of reagents therein specified. The yield was 80% and the polymer had an inherent viscosity of 2.08.

EXAMPLE 4.—COPOLYMER

A reaction vessel was charged with 123 g. trioxan, 62 g. cyclohexane, purified and dried as before, and 3.7 g. styrene. The mixture was maintained at 80° C. in an atmosphere of dry air and 0.125 g. tritolylmethyl hexafluoroarsenate was added as a 2½% solution in nitropropane with vigorous agitation. The mixture went cloudy after about 2 minutes, and polymerization continued for 3 hours.

The resulting polymer was recovered as in Example 1, but using approximately double the amounts of reagents therein specified. The yield was 80% of a copolymer having an inherent viscosity of 1.16.

EXAMPLE 5.—COPOLYMER

This was carried out in a manner similar to Example 3, except that the reactants were 160 g. trioxan, 80 g. cyclohexane, 5 g. dioxolane, and 0.75 g. tritolylmethyl hexafluoroarsenate. The reaction mixture went solid as soon as the catalyst was added, and polymerization continued for 3 hours. The resulting white copolymer was ground up and recovered as in Example 3.

EXAMPLE 6.—HOMOPOLYMER

A reaction vessel was charged with 30 g. trioxan (freshly distilled from stearylamine and calcium hydride) and 60 g. cyclohexane (dried by passing through an Amberlite IR-120 ion exchange column). The solution was maintained at 60° C. with vigorous agitation in an atmosphere of dry air and 3 ml. of a 1% solution of phenyl diazonium hexafluoroarsenate in nitropropane was added. The reaction was allowed to proceed for 3 hours. The reaction product was then filtered, washed with acetone, homogenized with 100 ml. acetone by high speed agitation, filtered and washed with 200 ml. of distilled water. The polymer was then treated with 400 ml. 3% ammonia solution at 85° C. for 5 min., filtered, washed with 200 ml. distilled water, homogenized with acetone as before and finally dried in a vacuum oven at 50° C. The yield of polymer was 17.1 g. (57%) and it possessed a $K_{222}$ value of 0.53 and an inherent viscosity of 1.13.

EXAMPLE 7.—COPOLYMER

A similar reaction to that described in Example 6 was carried out except that 0.9 ml. (3%) styrene was added to the reaction mixture. The yield of copolymer was 12 g. (40%) and it possessed a $K_{222}$ value of 0.53 and an inherent viscosity of 0.79.

EXAMPLE 8.—COPOLYMER

A reaction vessel was charged with 100 g. trioxan, 100 g. cyclohexane (both purified as in Example 6) and 3 g. dioxolan. The solution was maintained at 60° C. with vigorous agitation in an atmosphere of dry air and 0.0075% hydroxonium hexafluoroarsenate (based on the trioxan) was injected as a 1½% solution in nitropropane. The reaction was allowed to proceed for 3 hours and the copolymer then recovered as in the preceding examples. The yield of copolymer was 42%, and its inherent viscosity 0.94.

EXAMPLE 9.—COPOLYMER

A reaction vessel was charged with 150 g. trioxan, 150 g. cyclohexane (both purified as in Example 6) and 45 g. beta-propiolactone. The solution was maintained at 60° C. with vigorous agitation in an atmosphere of dry air and 0.009 g. hydroxonium hexafluoroarsenate was added as a 1% solution in nitropropane. The solution became cloudy almost immediately and thickened rapidly; reaction was allowed to proceed for 2½ hours and the copolymer was then recovered as before. The yield was 44%, and the inherent viscosity 0.96.

EXAMPLE 10.—COPOLYMER

A reaction vessel was charged with 150 g. trioxan, 300 g. cyclohexane (both purified as in Example 6) and 4.5 g. styrene. The solution was maintained at 60° C. with vigorous agitation in an atmosphere of dry air. 0.03 g. hydroxonium hexafluoroarsenate was added as a 1% solution in nitropropane. Very rapid reaction occurred but stirring was continued for 2½ hours. Polymer was then recovered as before, in 52% yield, with an inherent viscosity of 1.27.

EXAMPLE 11.—COPOLYMER 200 g. trioxan (freshly distilled from stearylamine), 200 g. cyclohexane as solvent, 6 g. styrene as comonomer and 0.05 g. trityl pentafluorohydroxyarsenate as catalyst were heated together at 60° C. for 2½ hours. The yield of polymer, which was worked up and recovered as described in Example 6, was 52%, and its inherent viscosity 1.69.

EXAMPLE 12.—COPOLYMER

Example 11 was repeated with the exception that 0.045 g. trityl pentafluorochloroarsenate was used as catalyst. The polymeric product was obtained in 56% yield, and had an inherent viscosity of 1.81.

EXAMPLE 13.—COPOLYMER 86 g. trioxan, 86 g. cyclohexane and 2.3 g. bicyclo [2,2,1]hept-2-ene were heated together at 60° C. in the presence of trityl pentafluorohydroxyarsenate (0.014% by weight of trioxan) as catalyst. After 2 hours polymer was recovered in a yield of 52.6%, the product having an inherent viscosity of 2.04.

What is claimed is:

1. A process for the preparation of a high molecular weight oxymethylene polymer which consists essentially in effecting the polymerization of trioxan in the presence of a catalytic amount of:
   (a) an oxonium or hydroxonium hexafluoroarsenate;
   (b) an aryl diazonium hexafluoroarsenate;
   (c) a nitryl or nitrosyl hexafluoroarsenate;
   (d) a sulphonium hexafluoroarsenate;
   (e) a compound similar to those designated (a) to (d) above, but wherein one or two of the fluorine atoms are each replaced by a chlorine atom, a hydroxyl group or a fluorosulphonate group; or
   (f) a carbonium hexafluoroarsenate wherein one or two of the fluorine atoms are each replaced by a chlorine atom or a hydroxyl group.

2. A process according to claim 1 wherein the catalyst is triethyl oxonium hexafluoroarsenate.

3. A process according to claim 1 wherein the catalyst is phenyl diazonium hexafluoroarsenate.

4. A process according to claim 1 wherein the catalyst is triethyl sulphonium hexafluoroarsenate.

5. A process according to claim 1 wherein the catalyst is triphenylmethyl pentafluorochloroarsenate, triphenyl methyl pentafluorohydroxyarsenate, or phenyl diazonium hydroxypentafluoroarsenate.

6. A process according to claim 1 wherein the trioxan is reacted in an amount between 50 and 99.99% by weight, based on the total weight of reactants.

7. A process according to claim 1 wherein the polymerization is effected under anhydrous conditions.

8. A process according to claim 1 wherein the polymerization is effected in the presence of an inert liquid medium.

9. A process according to claim 1 wherein the polymerization is effected at a temperature between 0° and 100° C.

10. A process according to claim 1 wherein the cyclic ether is copolymerized with at least one of the following: styrene, α-methyl substituted styrenes, β-phenyl substituted styrenes, vinyl naphthalenes, an aldehyde, an allyl compound, a cyclic ester, an unsaturated aliphatic hydrocarbon having up to 10 carbon atoms, a vinyl ether, a vinyl ester, an N-vinyl heterocyclic compound or a C-vinyl heterocyclic compound.

11. A process according to claim 1 wherein the cyclic ether is copolymerized with at least one of the following: styrene, α-methyl styrene, α-phenyl styrene, o-methyl styrene, m-methyl styrene, p-methyl styrene, anethole, 1-vinyl naphthalene, 2-vinyl naphthalene, stilbene, indene, coumarone, acenaphthylene, anisaldehyde, an allyl compound, β-propiolactone, delta-valerolactone, epsilon-caprolactone, trichloroethylidene lactate, methyl glycollate, lactide, ethylene oxalate, dioxanone, isobutene, butadiene, isoprene, pentadiene-1,3; cyclohexene, heptene-1, octene-1, cyclopentadiene, 4-vinyl cyclohexene, β-pinene, a vinyl ether, a vinyl ester, N-vinyl heterocyclic and C-vinyl hetercyclic compounds, bicyclo(2,2,1)hept-2-ene, bicyclo(2,2,1)hepta-2,5-diene.

References Cited

UNITED STATES PATENTS 3,219,631  11/1965  Kullmar et al. _____ 260—67
3,317,477   5/1967  Wilson et al. _____ 260—73

WILLIAM H. SHORT, *Primary Examiner.*

L. M. PHYNES, *Assistant Examiner.*

U.S. Cl. X.R.

260—64, 67.5, 72, 73